(12) United States Patent
Diaz Cervera et al.

(10) Patent No.: US 7,548,530 B2
(45) Date of Patent: Jun. 16, 2009

(54) RADIO ACCESS NETWORK AND NETWORK ELEMENTS FOR PROVIDING MOBILE COMMUNICATIONS SERVICES

(75) Inventors: José Diaz Cervera, Stuttgart (DE); Rolf Sigle, Weinstadt (DE); Kristiaan Venken, Schilde (BE); Ignacio Gomez Vinagre, Antwerp (BE)

(73) Assignee: ALCATEL, Paris (FR)

( * ) Notice: Subject to any disclaimer, the term of this patent is extended or adjusted under 35 U.S.C. 154(b) by 1139 days.

(21) Appl. No.: 10/425,916

(22) Filed: Apr. 30, 2003

(65) Prior Publication Data
US 2003/0214925 A1 Nov. 20, 2003

(30) Foreign Application Priority Data
May 17, 2002 (EP) .................. 02360152

(51) Int. Cl.
*H04Q 7/30* (2006.01)
(52) U.S. Cl. .................. 370/338
(58) Field of Classification Search .................. 370/338
See application file for complete search history.

(56) References Cited

U.S. PATENT DOCUMENTS 6,801,542 B1 * 10/2004 Subbiah ............. 370/467
2001/0053145 A1 * 12/2001 Willars et al. ............. 370/352
2002/0150091 A1 * 10/2002 Lopponen et al. ......... 370/389
2003/0165160 A1 * 9/2003 Minami et al. ............ 370/466
2003/0169734 A1 * 9/2003 Lu et al. .................. 370/386
2003/0185177 A1 * 10/2003 Chitrapu et al. .......... 370/335
2004/0002332 A1 * 1/2004 Noma .................... 455/428
2004/0120474 A1 * 6/2004 Lopponen et al. ...... 379/88.17

FOREIGN PATENT DOCUMENTS

EP 11611062 A2 12/2001
WO WO 02/30082 A2 * 4/2002

OTHER PUBLICATIONS

ETSI Document 3GPP TS 25.410 entitled "Utran Iu Interface: general aspects and principles", undated 5 pages.

* cited by examiner

*Primary Examiner*—Melvin Marcelo
(74) *Attorney, Agent, or Firm*—Sughrue Mion, PLLC (57) ABSTRACT

Provided are a radio access network, a distributed radio network controlling structure and a network element, each providing mobile communications services, and each having controlling elements including at least one control plane server for providing control plane functions and at least one user plane server for providing user plane functions, and a network having a mapping function for interfacing the radio control elements with a core network. Using this solution, only the network element containing a mapping function interfaces with the core network.

12 Claims, 8 Drawing Sheets

| | Iu-CS and Iu-PS signalling | Iu-PS | Iu-CS | Iu-BC |
|---|---|---|---|---|
| IP | SCCP identification (Global Title) | user data GTP-TEID | UDP port number¹ | TCP port number |
| ATM | SCCP identification (Global Title) | GTP-TEID | AAL2-CID | TCP port number |

RADIO ACCESS NETWORK AND NETWORK ELEMENTS FOR PROVIDING MOBILE COMMUNICATIONS SERVICES

The invention is based on a priority application EP 02 360 152.9 which is hereby incorporated by reference.

FIELD OF THE INVENTION

The present invention relates to a radio access network and network elements for providing mobile communications services.

BACKGROUND OF THE INVENTION

The architecture and the design of modern radio access networks, such as UTRAN (UMTS terrestrial radio access networks; UMTS: Universal Mobile Telecommunications System) become more and more complex. The overall mobile radio systems have a lot of different entities, devices and components, namely user terminals, radio base stations, at least one radio network controller for controlling a cluster of radio base stations, and switching devices, such as a mobile switching center for establishing circuit-switched connections to public switched telephone networks (PSTN) or the like. Also routers for establishing packet-switched connections to IP based networks, esp. to the world wide web, may be installed as well.

Basically the base stations and the radio network controller are constituting the radio access network which is also referred to as RAN. The switching devices are constituting the so-called core network. The interface between the RAN and the core network is quite complex, in the case of UTRAN an so-called Iu interface is used as being defined by the ETSI document 3GPP TS 25.410 having the title "UTRAN Iu Interface: general aspects and principles".

The RAN is providing mobile radio services to a wide geographical area which is divided into a multiplicity of radio cells. Every cell is controlled by a base station, and each base station controls at least one radio cell. In the UTRAN which is operating in accordance with the UMTS standard the base stations are referred to as node B. The base stations support the connection establishment to the terminals and establish the connections to a plurality of terminals in a radio cell. The connection has the form either of a permanent connection for the transmission of circuit switched data or a non-permanent connection for the transmission of packet switched data. The data signals transmitted via the connection are representing all kind of communication data, such as voice, audio, text, video data or other kinds of user data.

The network elements for controlling the radio cell clusters are the radio network controllers, also referred to as RNC. Each RNC is assigned to a plurality of base stations, typically up to few hundred base stations. The RNC performs for example the radio resource management and the terrestrial resource management of a radio cell cluster. In particular, the RNC controls transmission power on radio bearers, handovers (transfer of a terminal from one radio cell into another) as well as the macro diversity mode.

The RNC is connected via interfaces to the other network elements. In UMTS this means that a RNC comprises at least one Iu-interface to a core network, possibly one or several Iur-interfaces to another RNC, at least one Iub interface to a base station (e.g. to a Node B), and at least one logical interface to a terminal UE which leads physically across the Iub-interface or the Iub and Iur interfaces.

In the existing radio access networks, such as the conventional UTRAN, all control and user plane information relative to a particular user terminal or to a certain area are exchanged via the Iu interface between the core network and the radio network controller which is the serving controller for this user terminal. In an evolved UTRAN, it is foreseen that the radio network controller is split in its control and user planes, which are located in different network elements, herein also called radio network controlling elements.

Figure 1A:
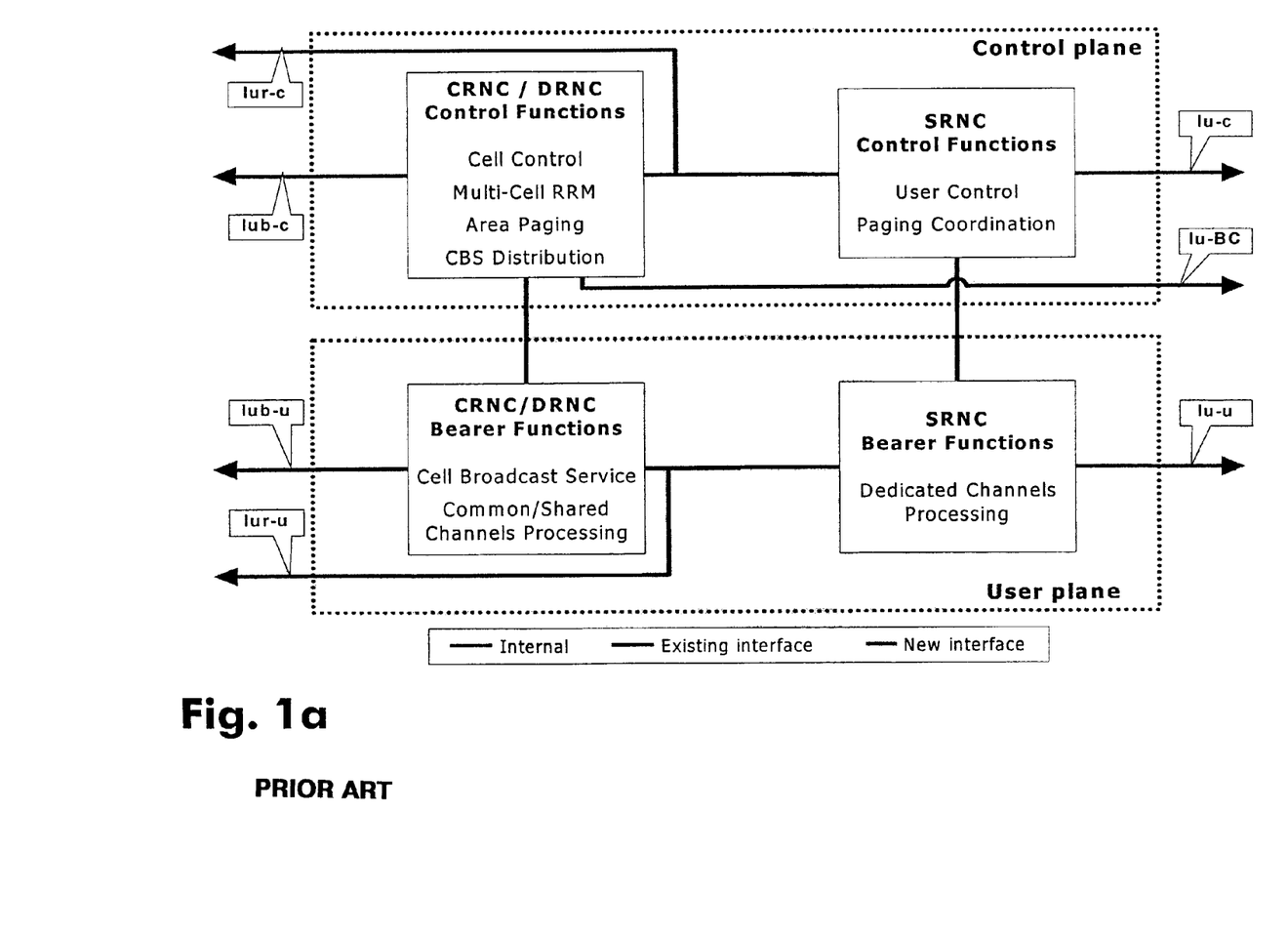
FIG. 1a showing a conventional radio network controller (RNC)
Figure 1B:
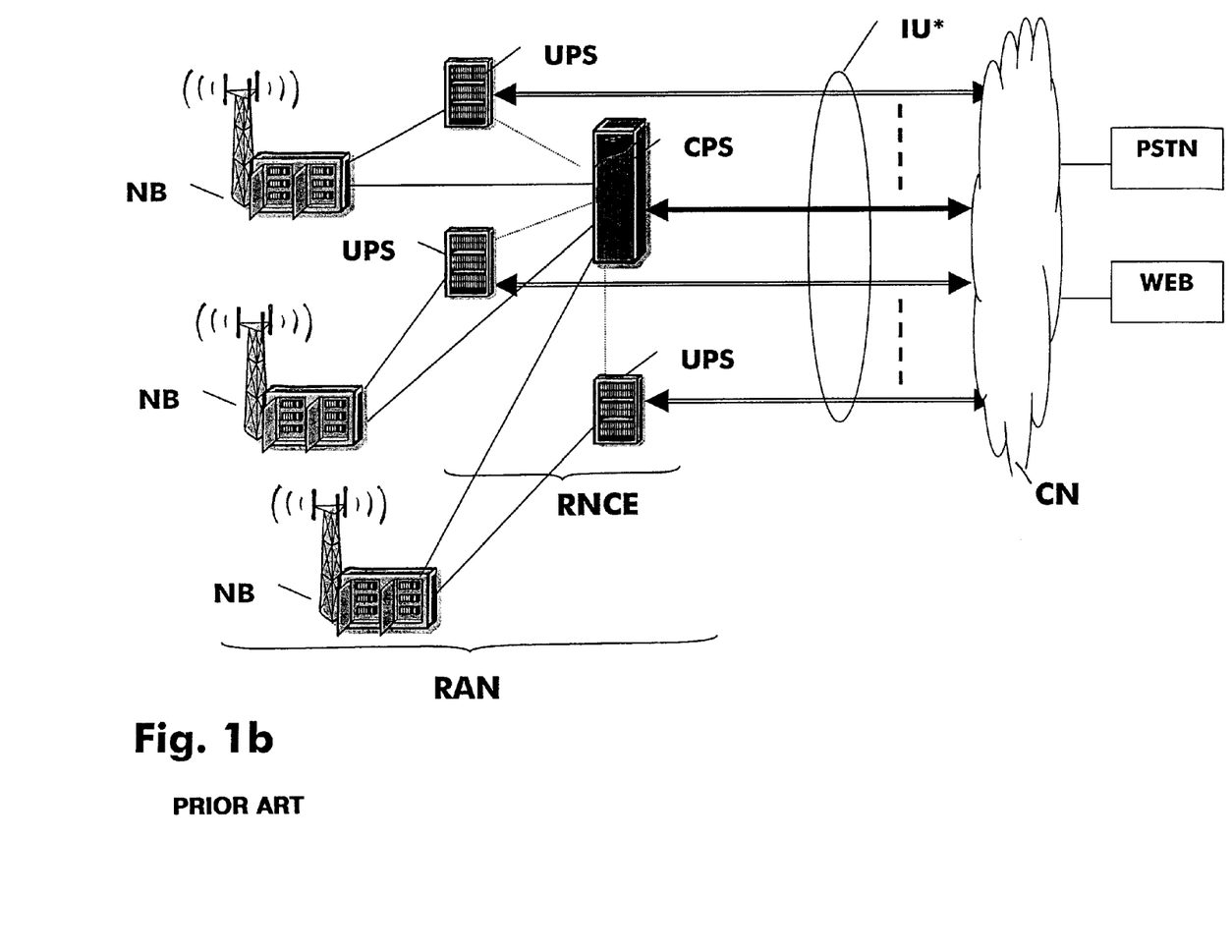

The principle of this clear separation between the control and user planes is shown in the FIGS. 1a/b. As can be seen from FIG. 1a the user plane contains all the channel processing, e.g. header compression, radio link control, channel multiplexing and macro-diversity combining. The control plane encompasses all signaling related processing for application protocols, such as NBAP (Node B Application Part), RNSAP (Radio Network System Application Part) and RANAP (Radio Access Network Application Part) on the RAN-CN interface, and also signaling for radio resource control of the air interface (RAN-UE interface, i.e. Uu).

This separation allows to separately scale both planes, what results in turn in a better scalability for the whole system. With the split of the RNC, the RAN will be based on a higher number of smaller and simpler network elements as shown in FIG. 1b.

However, this separation also implies a higher number of hardware elements resulting in a higher number of external interfaces; some of them are new and must be defined. The split of control and user planes has also a certain impact on QoS (Quality of Service) provisioning, a problem which must be analyzed and solved in detail.

The RNC as shown in FIG. 1b is complex assembly of a control plane server CPS and a plurality of user plane servers UPS for carrying out control or user plane functions respectively. These different types of servers perform many different and sometimes unrelated functions. This introduces extra complexity in the design of the RAN and even more of the whole mobile radio system.

If both planes are split, the Iu, Iur and Iub interfaces are also split in their control and user plane components as can be seen from FIG. 1a. However, this does not require changes in the RNC architecture, since different protocols for the control and the user plane are already used for these interfaces. The control parts of the interfaces would include the different application parts (so-called RANAP, RNSAP and NBAP), whereas the bearer parts would contain the different frame protocols.

Signaling between the RAN and the UE is also considered as belonging to the control plane. Therefore, the RRC (Radio Resource Control) protocol is terminated in the control plane, whereas layer 2 protocols (RLC, MAC) and macrodiversity combining and splitting are located in the user plane.

The split RNC is connected via a modified Iu* interface which has to manage the exchange of information and control signals between the core network CN and a lot of different RNC elements, namely the CPS and UPS servers. The more servers are needed to realize the whole RNC the more complex is the design of the Iu* interface.

In an evolved RAN architecture as shown in FIGS. 1a/b, the user and the control planes are separated into different network elements. This implies that the core network CN must exchange control and user information related to a particular user terminal UE with two different network elements. Moreover, information not linked to a particular user but to a certain cell or area (e.g. paging or cell broadcast service) must also be directed to the appropriate control or user plane server (s).

With the suggested split of the RNC functions, there appears the need for a solution to minimize the impact on the RAN-CN interface., i.e. the Iu interface. In this respect it would be desirable to make use of a standard interface, such as that Iu interface which is known from UMTS. Further there seems to be a need for a new RNC internal interface to manage better the exchange of data between the UPS and CPS elements. This interface should be able to transport at least control information for the configuration of user plane elements and feedback information such as status, error or event reporting, etc.

Therefore the object of the invention is to overcome the drawbacks as mentioned above and to present an advantageous design for a new radio access network which can easily be connected to the core network.

SUMMARY OF THE INVENTION

The object is solved by a radio access network for providing mobile communications services, the radio access network having radio network controlling elements comprising at least one control plane server for providing control plane functions and at least one user plane server for providing user plane functions, the radio access network further having a network element containing a mopping function for interfacing the radio control elements with a core network.

There is also proposed a distributed radio network controlling structure in a radio access network for providing mobile communications services, the radio network controlling structure having radio network controlling elements comprising at least one control plane server for providing control plane functions and at least one user plane server for providing user plane functions, the radio controlling structure further comprising a network element containing a mapping function for interfacing the radio controlling elements with a core network.

These objects are also archieved by a network element in a radio access network for providing mobile communications services, the radio access network having radio network control elements comprising at least one control plane server for providing control plane functions and at least one user plane server for providing user plane functions, the network element of the radio access network containing a mapping function for interfacing the radio control elements with a core network.

Thus the invention presents a new solution to hide the RNC split from the core network CN. Moreover, the invention also enables to hide SRNS (serving radio network subsystem) user plane relocation from the CN. Both effects are achieved by the proposed utilization of transport address mapping within the Radio Access Network. Using this solution, only the network element containing the mapping function interfaces with the CN, said network element preferably being a transport address mapping server (TAMS).

According to a preferred embodiment of the invention and with respect to the direction from the CN to the RAN, the mapping function is able to distinguish control and user plane information belonging to different users and distributes it to the appropriate control or user plane server. In the other direction from the RAN to the CN, the mapping function receives control and user plane information from different servers and forwards it to the appropriate CN node.

BRIEF DESCRIPTION OF THE DRAWINGS

Further advantages will become apparent from the following more detailed description of a preferred embodiment. For explanation purposes some schematic drawings are added and are shown in the enclosed figures:

FIG. 1b showing a radio access network (RAN) using the RNC of FIG. 1a;

DETAILED DESCRIPTION OF THE INVENTION

Figure 2:
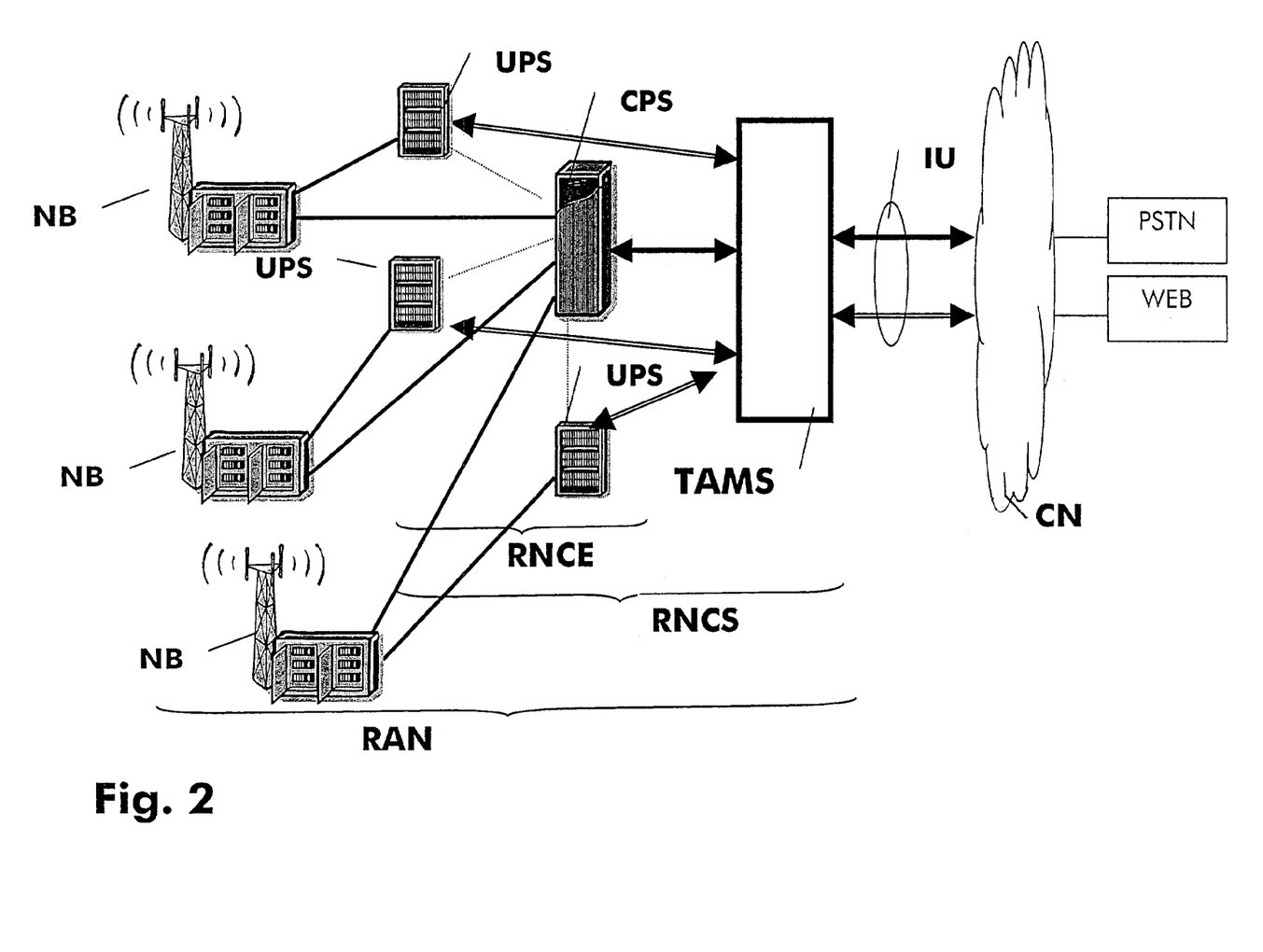
FIG. 2 showing the architecture of a RAN being designed and having different control elements RNCE and a network element TAMS containing a mapping function according to the invention.

In FIG. 2 there is shown a radio access network RAN having an infrastructure according to the invention. The RAN is having a radio network controller RNC being split into various entities which are distributed over different locations within the network. These functional entities are at least one control plane server CPS being located at the main site of the RNC and several user plane servers UPS being located closely to the base stations NB. The servers CPS or UPS are either for managing the control plane functions or the user plane functions within the RAN. Thus the CPS is installed at a more central location whereas the UPS are preferably distributed in that each of them is connected to a subset of base stations NB. Because of simplicity only one for each subset is shown in the FIG. 2 and is also referred to as Node B.

All the UPS are connected to the CPS which is located at the main site of the RNC. Again, this server CPS is managing the control plane functions of the radio access network whereas the UPS are managing the user control functions, each one for a dedicated group of users.

Figure 3A:
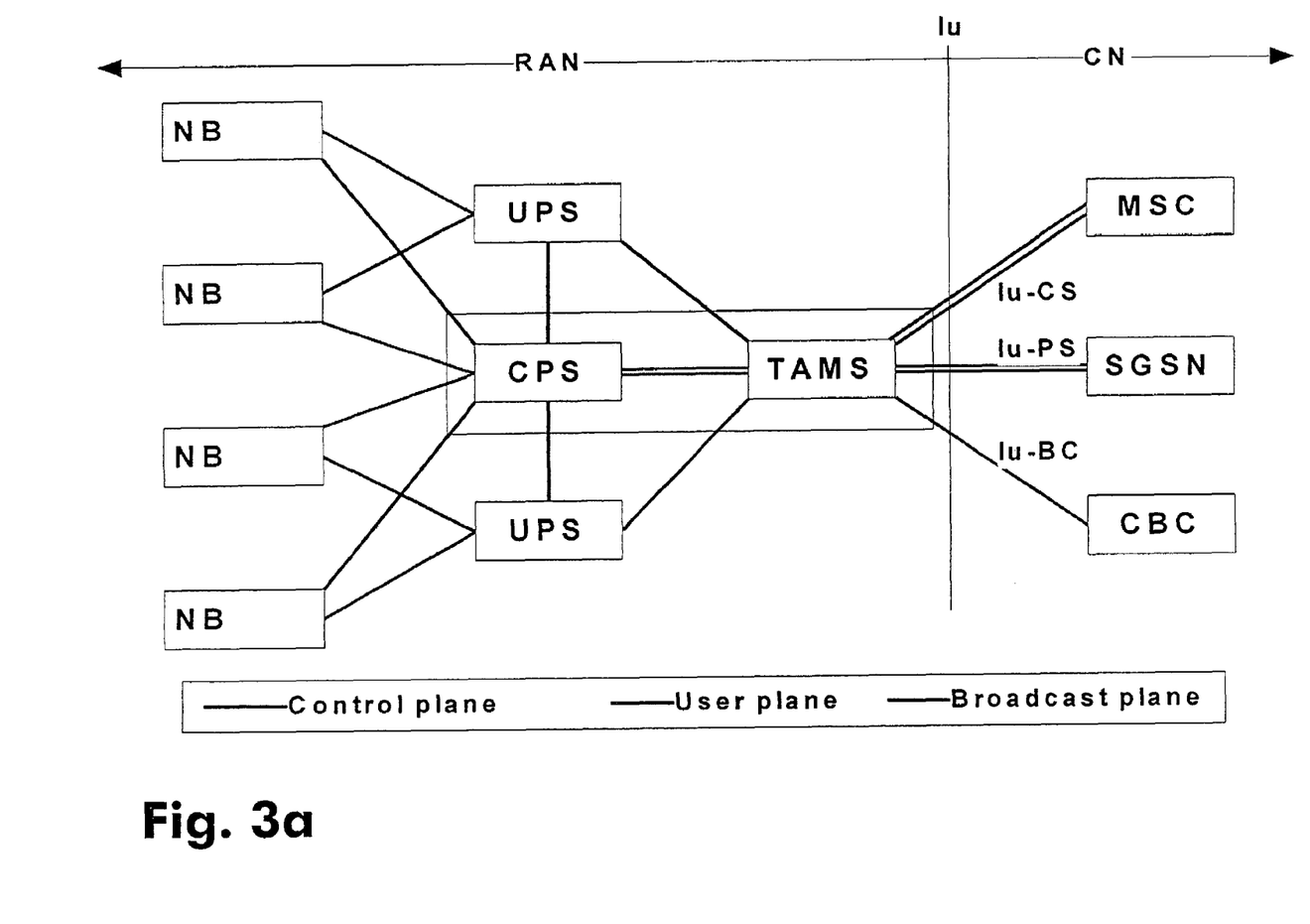
FIG. 3a showing a functional block diagram of the radio access network RAN according to a first embodiment FIG. 3a showing a functional block diagram of the radio access network RAN according to a second embodiment FIG. 4 showing a functional block diagram of the protocol stacks used on the circuit-switched services interface Iu-CS FIG. 5 showing a functional block diagram of the protocol stacks used on the packet-switched services interface Iu-CS FIG. 6 showing a functional block diagram of the protocol stacks used on the cell broadcast services interface Iu-BC FIG. 7 showing a table with TNL (transport network layer) information used for the mapping in the TAMS
Figure 3B:
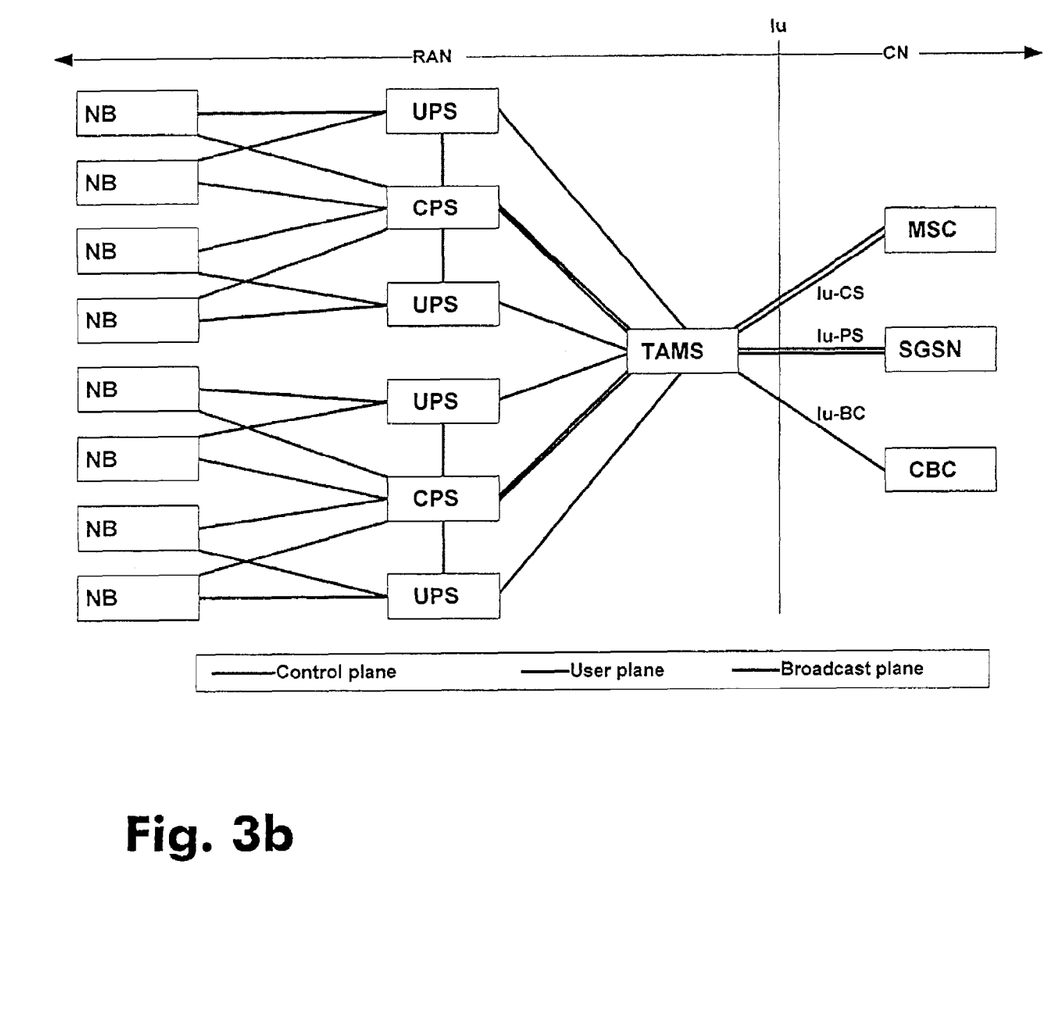

As can been seen from the FIGS. 3a and 3b there is a plurality of possibilities for establishing a radio network controlling structure as claimed. One possibility is that beside several UPSs a single CPS is used, and that the TAMS function is (optionally) integrated in said CPS (see FIG. 3a). Another possibility is to use at least two CPSs and to have the TAMS function implemented in a stand-alone server which is connected to said UPSs and CPSs (see FIG. 3b).

For describing in more detail the UPS, CPS and TAMS we first explain the function of the base stations NB:

In the case of a UMTS system, common transport channels (FACH, RACH, DSCH)—one or more for each cell—are provided. The dedicated DCH channels are provided for each UE and are divided between a plurality of base stations NB in accordance with the relevant UE position in the radio cell cluster.

All together, the base stations NB and the RNC including the CPS and UPS are constituting the radio access network RAN. In order to have a common and easy to implement interface between the radio access network RAN and a core network CN, which is e.g. a circuit switched PSTN or a packet switched IP based network, the RAN further has a network element TAMS containing a mapping function. This TAMS is represented by a transport mapping address server being connected to the core network CN via a standard interface IU, the interface as such is defined in the UMTS standard.

The transport address mapping server TAMS which is introduced here (see FIGS. 3a and 3b) into the radio access network RAN performs a mapping function as follows:

In the direction from the core network CN to the RAN the TAMS is receiving from the CN control and user plane information belonging to different users of the RAN as well as user plane and control plane information related to a particular cell or area (e.g. paging or cell broadcast service information), and then the TAMS is distributing this control information to the appropriate control plane server CPS and distributing the user information to the appropriate user plane server UPS of the RAN. In the other direction, namely from the RAN to the CN the mapping function of the TAMS is receiving from the servers CPS and UPS the control or user plane information respectively, the information is belonging to different users or is related to a particular cell or area (e.g. acknowledgements of the reception of a cell broadcast service message by the UTRAN). Then the mapping function is forwarding this information to appropriate nodes of the core network CN. By doing so a full duplex connection between the radio access network RAN and the core network is established over a standard interface Iu, therefore the implementation does not produce additional effort for designing a new interface or for modifying the standard interface.

In addition to this the proposed architecture (as shown in FIG. 2 and explained with respect to the FIGS. 3a/b) has further advantages, such as high flexibility and scalability of the whole network. In particular the introduction of new or additional network elements, especially of further UPS and/or CPS servers, is quite easy to perform. Because any modification of the RAN has no direct impact on the existing design of the IU interface. From the core network point of view the distributed architecture of the random access network, esp. the split design of the RNC, is hidden by the implementation of the proposed transport mapping address server TAMS.

In summary, with the proposed introduction of a TAMS the mapping function therein acts as a proxy between the CN and the appropriate control plane or user plane server in the RAN. Therefore one could say that the TAMS is representing an interworking function element within the whole mobile radio system.

With respect to the split RNC the functions of different elements of the RNC for controlling the radio access network RAN, namely the UPS and CPS servers, shall be described in even more detail as follows:

The description is mainly focused on the transmission network layer (also referred to as TNL), which offers a data bearer service for the transmission of the different radio network layers (also referred to as RNL) protocols between the different network elements. Moreover, a signaling bearer service is also offered by the TNL to allow the exchange of RNL control information between the different network elements in the RAN and with the CN. Therefore, a more detailed description of the different air interface protocols is only relevant here from the point of view of their distribution across the control plane and user plane servers, CPS and UPS respectively, as being described here.

On the one hand, the CPS is responsible for all radio network controlling (also referred to as RNC) related procedures, i.e. it contains the termination of the different Application Parts, such as the so-called RANAP (radio access network application part), the RNSAP (radio network system application part), and the NBAP (node B application part) used for the exchange of control information between the different network elements in the radio access network (RAN) and with the core network (CN), which belong to the RNL control plane. The CPS contains also the termination of the SABP (Service Area Broadcast Protocol), which is used for the reception of cell broadcast service (CBS) messages. Therefore, the CPS is responsible for distributing CBS messages to the appropriate UPSs, which in turn distribute internally CBS messages to the BMC (Broadcast/Multicast Control) layer entities responsible for the broadcast in each particular cell. Moreover, the CPS contains as well the RNC part of the RRC (radio resource control) protocol, used for the exchange of control information between the RAN and the mobile terminal (UE).

Although the main purpose of the RRC protocol is the exchange of control information between the RAN and the UE, RRC messages are transported over radio bearers, offered by the RNL user plane. Therefore, all information belonging to the different air interface protocols is seen as RNL user plane information from the point of view of RAN interfaces.

On the other hand, the UPS contains all radio processing associated with layer2 (L2) protocols, i.e. it contains the PDCP (packet data convergence protocol), the RLC (radio link control) and MAC (medium access control) protocols. The BMC layer, responsible for the transmission of cell broadcast service messages in a particular cell is also located in the UPS. Nevertheless, the distribution of cell broadcast service (CBS) messages to the appropriate cells, once they are received from the core network (CN), is partially performed in the CPS and the UPS. The CPS is responsible for interfacing the CN and distributing CBS messages to the appropriate UPSs, which in turn are in charge of the internal distribution of the messages to the BMC layers of each particular cell.

The proposed transport address mapping function is performed by the TAMS and affects basically the IU interface (see FIG. 2) so that further description is focused on this interface.

As shown in the FIGS. 3a and 3b there are three different variants of the Iu interface used, namely one for circuit-switched services (Iu-CS), one for packet-switched services (Iu-PS) and one for cell broadcast services (Iu-BC). Whereas all variants of the interface are terminated by the radio controlling elements RNCE on the RAN side, they are terminated by different network elements on the CN side. These elements are the mobile switching center (MSC) for the Iu-CS interface, the serving GPRS support node (SGSN) for the Iu-PS interface and the cell broadcast center (CBC) for the Iu-BC.

In FIG. 3a there is shown an embodiment in which only a single CPS is used. In FIG. 3b a different embodiment is shown in which at least two CPSs are used. Further embodiments could be realized as well.

In all cases the main purpose of the TAMS is to hide the split of control and user planes from the CN. Therefore, the CN must use the transport address of the TAMS for the exchange of all types of information. From the point of view of the Core Network, the communication with the proposed structure appears equivalent to a communication with a standard radio network controller (RNC), whose transport address is the transport address of the TAMS.

The TAMS does interface all three variants of the Iu interface towards the CN. Therefore, it differentiates information coming from each CN node, and is able to separate generic control plane information, user specific control plane and user plane data, as well as cell broadcast service information. Thus the TAMS exchanges each type of information with the appropriate network element within the RAN.

The TAMS also separates the different types of information sent by the CN based on the transport protocols used and on the values of certain header fields. This allows for the separation of generic control information, cell broadcast information and data and control information belonging to particular users, which can be exchanged with the appropriate network element within the RAN.

Both generic and user specific control plane information, as well as cell broadcast service information, is exchanged with the appropriate CPS, whereas user specific user plane information is exchanged with the appropriate UPS server. As the different types of information can be separated by the TAMS based on the transport protocols used, it is possible to further split the CPS and/or the UPS in smaller network elements. These smaller elements may be responsible for area specific and user specific functions, without significantly impacting the operation of the TAMS, which will exchange each type of information, based on the transport stack used or on different transport protocol parameters, with the appropriate server.

In the opposite direction, the TAMS will receive information from different UPSs and CPSs and will exchange this information with the appropriate CN node. Different protocol stacks are used for the different variants of the Iu interface. Radio network layer (RNL) protocols can be used independently of transport network layer (TNL) protocols wherein at least two different possibilities exist for the TNL, namely ATM-based and IP-based transport.

Although the mechanisms described here can be applied to both IP and ATM based transport, the complexity of the implementation is much lower in the IP case, as discussed later. First it is here described in detail how the TAMS can separate different types of information exchanged between the CN and the RAN. Such types of information are generic control information, user dedicated control information, user dedicated traffic as well as cell broadcast service messages.

Between the TAMS and the CN nodes, the standard Iu interface may be used with no changes, what implies using the same protocols used on Iu-CS, Iu-PS and Iu-BC today. The same protocols could be used between the TAMS and the different CPSs and UPSs, although this is not mandatory. One proposal is to reuse these protocols on the RAN side, and in this case the TAMS will then act as a relay between both interfaces, although performing the necessary transport address translations to address the appropriate CPS, UPS or CN node. Another proposal is to use a simplified version of the current protocol stacks; for instance, probably not all the functionality offered by the SS7 stack would be required on the TAMS-CPS leg, and a simplified stack could be used.

It is also possible to use a completely different protocol stack (see FIGS. 4, 5 and 6) which is advantageous when ATM/IP interworking is required (e.g. when the CN is ATM based and the RAN is IP-based or vice versa). Using tunneling between the TAMS and the UPS is another option, although this option seems less suitable for the communication between the TAMS and the CPS. Anyway, it is advantageous that on the interface between CN and TAMS, the standard Iu interface, with no changes, can be used.

As different mechanisms are applicable for the mapping mechanism itself, the following description is focused on how the TAMS can separate the different types of information, but no preference for a specific mapping option is given. In general, for IP based protocols, a mapping between IP addresses and UDP or TCP ports between both interfaces could be applied. In the ATM case, since connection oriented protocols like AAL2 are used, the mechanisms used are more complex, and involve the termination of AAL2 connections as well as the ALCAP protocol on the TAMS.

Figure 4:
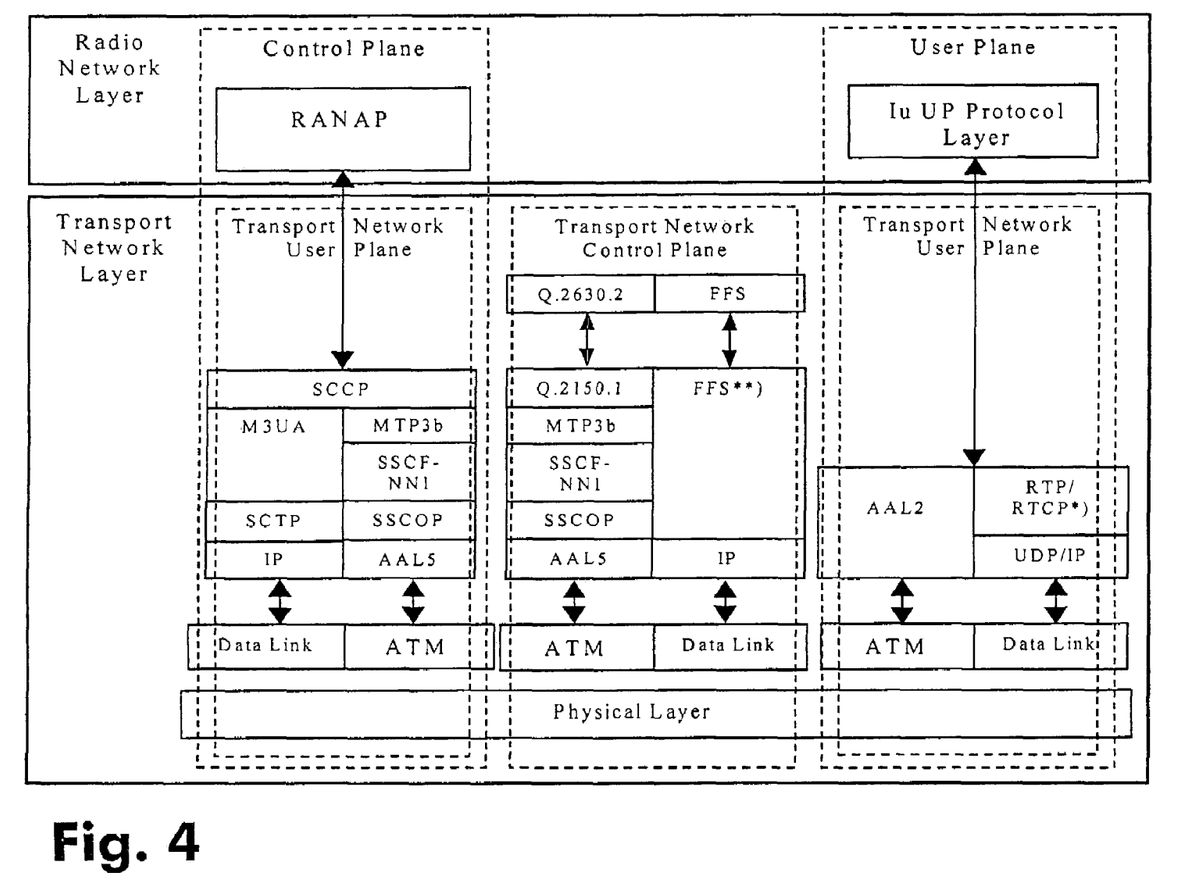
Figure 5:
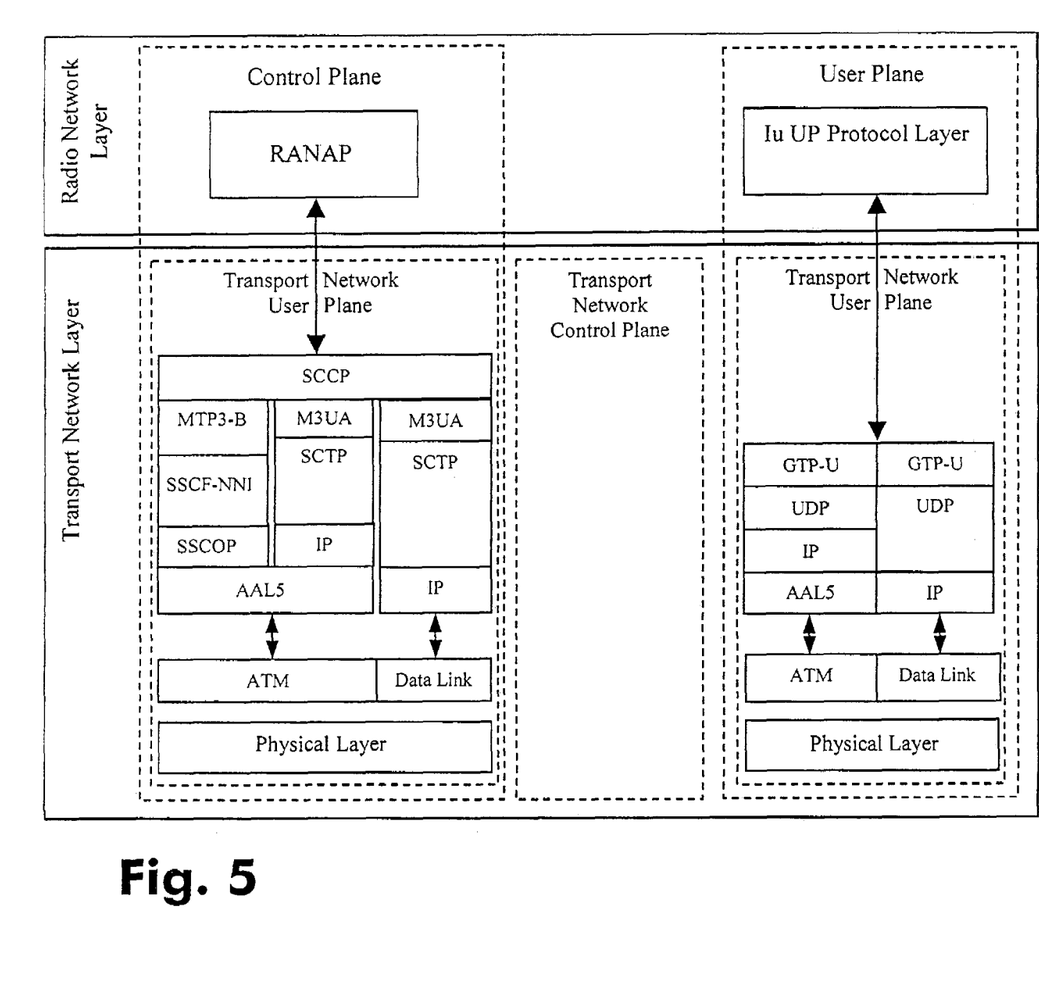
Figure 6:
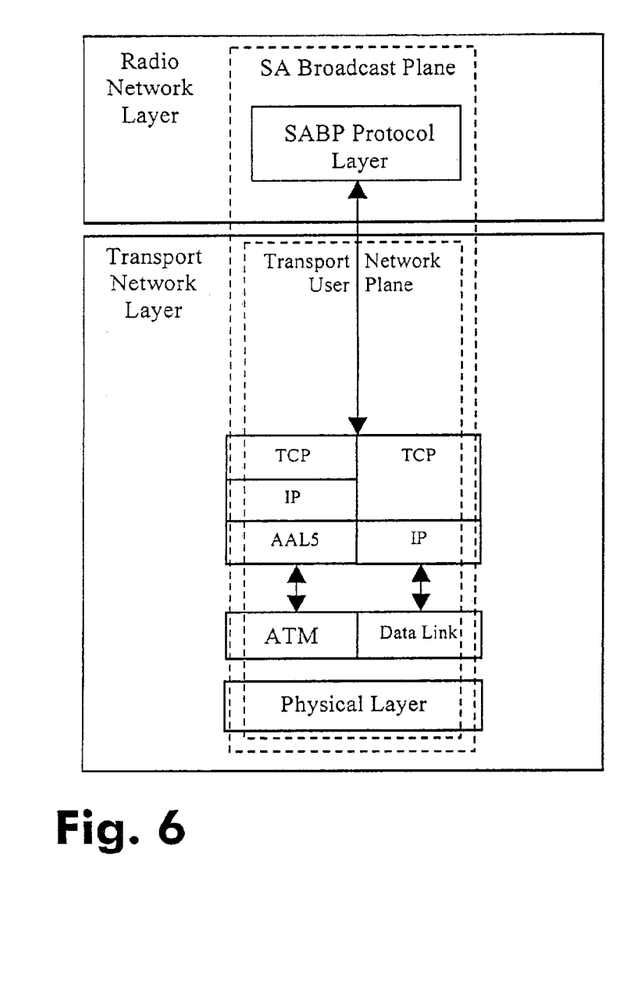

The different mechanisms applicable to each interface are now described in more detail by referring to the FIGS. 4, 5 and 6:

Basically the RNL protocols are the same for the Iu-CS and Iu-PS interfaces, although these interfaces differ on their TNL protocol stacks. For both interfaces, RANAP (radio access network application part) is only RNL Control Plane protocol used for the exchange of control information between the CN and the RAN. Moreover, user traffic is exchanged between the CN and the RAN by means of the Iu user plane protocol (Iu UP protocol).

The protocol stacks for the Iu-CS and Iu-PS interfaces can be found in FIG. 4 and FIG. 5, respectively. For each plane, the ATM-based and IP-based TNL stacks are represented on the left and right sides, respectively.

With respect to the Iu-CS interface (see FIG. 4) and the Iu-PS interface (see FIG. 5), the transport address mapping function is able to differentiate transport bearers associated to generic control plane information, and UE specific transport bearers associated to control plane and user plane information. No generic user plane information is to be transmitted across the Iu-CS or Iu-PS interfaces.

In the control plane, the RANAP protocol is used for the exchange of both generic and user specific control information between the CN and the RNC. Before any user plane data can be exchanged between a CN node, e.g. a mobile switching center (MSC) or a serving GPRS support node (SGSN) and a particular UE, a dedicated Iu signalling connection is established between the serving RNC associated to the UE and the CN node. After this connection is established, all control information related to this particular UE is exchanged between the CN node and the SRNC associated to the UE by means of this Iu signaling connection. However, for generic control information, connectionless mode is used. Paging notifications, whose purpose is to locate a particular UE, are also considered a part of the generic control information, since no Iu signaling connection exists for the paged UE towards the CN node initiating the paging procedure.

At the transport network layer (TNL) level, this distinction between Iu signaling connections associated to particular UEs and connectionless signaling for generic control is reflected in the fact that SCCP (signaling connection control part) connections are established to support the Iu signaling connections associated with the different UEs, whereas the SCCP connectionless mode is used to exchange generic RANAP messages (including paging). The use of the SCCP protocol on the Iu-PS and Iu-CS interfaces is independent from the use of an ATM-based or IP-based transport network, since only the underlying transport protocols change. Therefore, the transport address mapping function shall operate at the SCCP level, and it shall separately process information exchanged by means of the SCCP connectionless mode as well as each particular SCCP connection.

With respect to the user plane, since the transport stacks used for the Iu-CS and Iu-PS (see FIGS. 4 and 5 respectively) are completely different, at least the following two different approaches may be followed:

User plane information is transmitted across the Iu-PS interface through the user part of the GPRS Tunneling Protocol (GTP-U). GTP-U is always transported on UDP/IP, both for the ATM-based and the IP-based TNL stacks. On the Iu-PS interface, the UDP port number is fixed to indicate the use of the GTP-U protocol, and hence information belonging to different users can not be differentiated by means of the UDP port number, but through the Tunnel Endpoint Identifier (TEID) contained in each GTP-U packet.

Although in the Iu-PS interface the TNL User Plane protocol stacks are quite similar for ATM-based and IP-based transport, the protocol stacks used across the Iu-CS are completely different depending on the type of transport network used. Therefore, different mechanisms are used in the ATM-based and the IP-based cases to differentiate transport bearers belonging to different users.

In the IP case, the Real-time Transport Protocol (RTP), optionally supported by the Real-time Transport Control Protocol (RTCP), is used over UDP/IP for the exchange of user data. Neither RTP nor RTCP headers contain any port number, and hence RTP and RTCP ports correspond actually to the port numbers used by the UDP layer below. Therefore, information belonging to different users can be separated according to the UDP port number used.

Transport address mapping for an ATM-based Iu-CS interface case is the more complex case. Transport bearers belonging to different users make use of different AAL2 connections, and the ALCAP protocol is used on the Transport Network Control Plane to establish and release such connections. As AAL2 allows to multiplex different AAL2 connections onto a single ATM VC, each transport bearer can be uniquely identified by the ATM VC used and the connection identifier (CID) used in the AAL2 CPS packet header. Nevertheless, the TAMS must terminate the AAL2connections (and the ALCAP) protocol towards the CN, otherwise, no guarantees exist that the AAL2 path between the CN and the UPS are actually routed through the TAMS and moreover, problems may arise during UPS relocation. Whereas terminating AAL2 connections in the TAMS is possible, this implies some degree of complexity, since an AAL2 switch is required.

Finally, for the Iu-BC interface (see FIG. 6), there are no separated control and user planes, but a single plane named Service Area (SA) Broadcast Plane. In the RNL, the Service Area Broadcast Protocol (SABP) is used to exchange cell broadcast service (CBS) messages between the Cell Broadcast Center (CBC) and the RNC.

SABP is transported over TCP/IP both when an ATM-based and an IP-based transmission network are used. The transport bearer used for SABP can be easily distinguished from other bearers because it is the only one making use of TCP and because the TCP port number used is fixed to identify the SABP protocol.

In the case an IP based RAN must be connected to an ATM based CN or vice versa, an interworking unit (IWU) running an IP-ALCAP protocol (ALCAP: access link control application part) is preferably used. In this case, when the RAN has its control and user planes split, the TAMS mechanism described here is applicable. In this case the TAMS will be bundled together with the IWU. The IWU would then terminate all transport protocols towards the CN, and the TAMS function would then separate the different types of information and address it consequently to the appropriate CPS or UPS in the RAN.

For the Iu-BC interface, the mapping can be statically configured and it could be even configured directly without passing via TAMS, since the same TCP port is always used for the SABP protocol. For the Iu-CS and Iu-PS, mapping for common signaling bearers can also be configured statically.

Nevertheless, for dedicated signaling bearers and for data bearers, the configuration is dynamical, and the parameters needed for the establishment and release are carried within RANAP messages. Although an scenario where the TAMS intercepts and decodes RANAP messages in order to retrieve the necessary transport parameters could be envisaged, this solution has a number of disadvantages. For example, in case of a relocation, parameters carried in certain RANAP messages could be no longer valid.

The TAMS shall preferably act only at the TNL level, but not at the RNL level, because this would not respect the layered model and therefore would be less acceptable in practice.

Therefore, although the mapping between both interfaces must be carried out by the TAMS, the initial configuration or the re-configuration of the mappings must be controlled by the CPS. Of course, if CPS and TAMS are integrated (see FIG. 3a), the co-ordination between both is internal.

Otherwise (see FIG. 3b), signaling is required between the CPS and the TAMS in order to set-up dynamical mappings when required, and this process is always controlled by the CPS. This solves any problems in case of relocation and permits the relocation of the control plane without the CN being aware of it. In this case, the CPS would simply reconfigure the TAMS to exchange involved user plane information to the new UPS.

In summary: and as a result of the realization of the TAMS, each particular connection between the CN and the RAN is divided by the TAMS in two legs. The TAMS performs the mapping (per user, per cell or per area or even per media-stream), between the different types of transport bearers identified on both legs of the Iu-connection, i.e. CN-to-TAMS connection on the one hand and TAMS-to-CPS or TAMS-to-UPS connections on the other hand. It also translates the mapping identifiers, and relays information between both legs of the connection.

For this mapping, the TAMS uses TNL-information available at different layers in the protocol stack associated with each of the incoming information flows, together with configuration information it maintains on the different connections (per user, per cell, per area or per media-stream), synchronized by communication with the involved CPS or UPS server.

Figure 7:
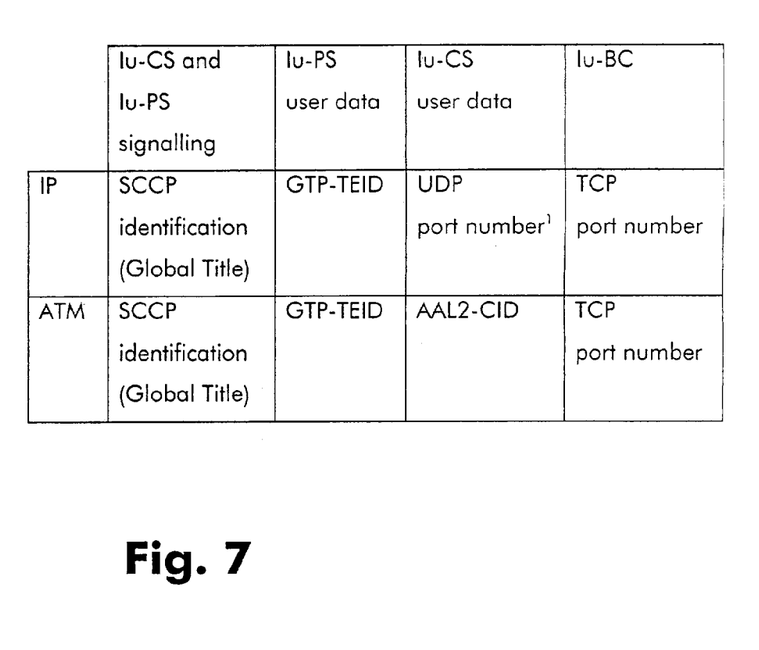

The table in FIG. 7 is showing the TNL-information used for this purpose:

In the case of signaling, the connectionless mode of SCCP, as well as each particular SCCP connection, can be separated by the TAMS connectionless mode is used for control information not referred to a particular user, whereas each SCCP connection is used for the transport of signaling belonging to a particular user.

In the case of the Iu-BC protocol, the TCP port is always the same, and it should only be checked to ensure that the transmitted information belongs to the cell broadcast service.

For Iu-PS and Iu-CS user data, each particular transport bearer belongs to a different user. For Iu-PS, the GTP-TEID can be used in the ATM and IP cases to separate information belonging to different users. For Iu-CS, the UDP port can be used for that purpose in the IP case. In case of a connection oriented transport, such as ATM, the TAMS also takes part in connection setup and release for both legs of the connection, thus terminating also the connection establishment protocol (ALCAP or IP-ALCAP). This makes the TAMS more complex and the solution less straightforward.

In summary, the TAMS performs the following functions
On reception of information from the CN or the CPS/UPS
  to extract leg-identification from the incoming message, based on the protocol stack used and on the previously mentioned protocol header fields;
  to look-up mapping information from its database, using the leg information as a key;

to translate incoming leg-information into outgoing leg-information (including the appropriate transport address translation);

to relay the received message between the incoming and the outgoing leg;

And to reconfigure its database of leg-information on behalf of a CPS.

To participate in connection setup of connection oriented protocols (AAL2, SCCP), on both interfaces or only in one of them, for instance in case of IP/ATM interworking or when a simplified SS7 stack or another protocol stack is used between the TAMS and the CPS.

In the prior art the SRNS relocation procedure is a very complex procedure in which the serving RNC function for a particular UE is moved (relocated) to a different RNC. Obviously, as the control and user planes are nowadays located in the same network element, it is not possible to relocate only the control plane or only the user plane. Nevertheless, with the split of control and user planes, it will be possible to independently relocate the CPS and the UPS, although it will still be possible to relocate both of them together. User plane information is transmitted by means of frame protocols within the RAN, and it is very sensitive to delay and jitter, whereas control plane does not impose such strict time requirements. Therefore, it is expected that the UPS relocation occurs much more frequently than the CPS relocation (which could even not be applied at all), specially when the current RNC user plane is decomposed in several UPSs. The mapping mechanism according to the invention allows to carry out UPS relocation and hide it from the CN. In this case, the UPS relocation execution is controlled by the CPS, which also reconfigures the mapping in the TAMS to address the new UPS. The CN continues to use the TAMS transport addresses, and the relocation is carried out transparently.

From the description above it is apparent that a lot of advantages result from introducing the invention into existing networks, esp. into the UMTS radio access network (UT-RAN)

No impact on the Iu interface would be introduced if control and user planes are split. User plane relocation can be hidden from the CN, allowing to use smaller network elements without impacting the CN due to the higher number of SRNS user plane relocations. Using smaller network elements may be interesting in order to introduce new concepts such as server pooling, load balancing between servers, network redundancy and the like.

Another advantage is that the number of SRNS relocations between CN and RAN will be reduced seriously, because for the control plane they can be avoided in most cases, and for the user plane they can be hidden from the CN by the transport address mapping. No changes in existing protocols are envisaged.

Finally, the distributed architecture enabled by the invention can easily be adapted to other radio access network standards, including but not limited to the global system for mobile communication (GSM).

The invention claimed is:

1. A radio access network for providing mobile communications services, the radio access network comprising a radio network controlling element comprising at least one control plane server which provides control plane functions and at least one user plane server which provides user plane functions, and a network element which performs a mapping function for interfacing the radio network controlling element with a core network, wherein said mapping function separates control information and user information received from said core network and distributes control information to an appropriate control plane server and user information to an appropriate user plane server.

2. A radio access network according to claim 1, wherein the network element comprises a transport address mapping server which is connected to the core network via a common interface.

3. A radio access network according to claim 2, wherein the transport address mapping server further performs a translation function.

4. A radio access network according to claim 1, wherein the mapping function of the network element receives from the control and user plane servers control and user plane information belonging to different users, and the mapping function of the network element is forwards the information to appropriate nodes of the CN.

5. A radio access network according to claim 2, wherein the common interface is an Iu interface.

6. A radio access network according to claim 2, wherein the core network uses a transport address of the transport address mapping server to exchange all types of information with the radio access network.

7. A radio access network according to claim 2, wherein the transport address mapping server is integrated with the control plane server.

8. A radio access network according to claim 2, wherein the transport address mapping server is a standalone server.

9. A radio access network according to claim 2, wherein the mapping function comprises:

receiving an incoming message on an incoming leg from at least one of the core network, the user plane server and the control plane server;

extracting incoming leg-identification information from the incoming message, based on a protocol stack used and previously mentioned protocol header fields;

looking up mapping information in a database using the incoming leg-identification information;

translating the incoming leg-identification information into outgoing leg-identification information for an outgoing leg, including performing a transport address translation; and relaying the incoming message from the incoming leg to the outgoing leg, based on the translating and the performing of the transport address translation.

10. A radio access network according to claim 9, wherein the incoming leg is a port which connects the transport address mapping server to at least one of the core network, the user plane server and the control plane server.

11. A radio access network according to claim 9, wherein the outgoing leg is a port which connects the transport address mapping server to at least one of the core network, the user plane server and the control plane server.

12. A network element comprising at least one interface, said network element being in a radio access network which provides mobile communications services, and performs a mapping function for interfacing radio network controlling elements belonging to said radio access network with core network, wherein said radio network controlling elements comprise at least one control plane server for providing control plane functions and at least one user plane server for providing user plane functions, wherein said mapping function separates control information and user information received from said core network and distributes control information to an appropriate control plane server and user information to an appropriate user plane server.

* * * * *